(12) United States Patent
Nomura et al.

(10) Patent No.: US 8,024,973 B2
(45) Date of Patent: Sep. 27, 2011

(54) SEMICONDUCTOR ACCELERATION SENSOR

(75) Inventors: Akihiko Nomura, Miyazaki (JP); Kenji Kato, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 392 days.

(21) Appl. No.: 12/401,771

(22) Filed: Mar. 11, 2009

(65) Prior Publication Data

US 2009/0241670 A1 Oct. 1, 2009

(30) Foreign Application Priority Data

Mar. 28, 2008 (JP) ................................ 2008-086818

(51) Int. Cl.
*G01P 15/12* (2006.01)
*G01P 15/00* (2006.01)
(52) U.S. Cl. .................... 73/514.33; 73/514.01
(58) Field of Classification Search ............... 73/514.01, 73/514.16, 514.33–514.35
See application file for complete search history.

(56) References Cited

U.S. PATENT DOCUMENTS

| | | | | |
|---|---|---|---|---|
| 5,490,421 A * | 2/1996 | Ueyanagi | ................... | 73/514.33 |
| 6,062,082 A * | 5/2000 | Guenther et al. | ........... | 73/514.16 |
| 6,149,190 A * | 11/2000 | Galvin et al. | ................. | 280/735 |
| 6,845,670 B1 * | 1/2005 | McNeil et al. | ............. | 73/514.32 |
| 6,998,599 B2 * | 2/2006 | Lagakos et al. | ........... | 250/227.16 |
| 7,243,546 B2 * | 7/2007 | Sakamoto | ................... | 73/514.34 |
| 7,357,026 B2 * | 4/2008 | Ozawa | ....................... | 73/514.33 |

FOREIGN PATENT DOCUMENTS

| | | |
|---|---|---|
| JP | 2001-160626 | 6/2001 |
| JP | 2004-212403 | 7/2004 |
| JP | 2006-153519 | 6/2006 |

* cited by examiner

*Primary Examiner* — Max Noori
(74) *Attorney, Agent, or Firm* — Volentine & Whitt, PLLC

(57) ABSTRACT

A semiconductor acceleration sensor includes an acceleration sensor chip that includes a weight portion, a base portion provided around the weight portion with a gap therebetween, and beam portions flexibly connecting the weight portion and the base portion; and a stopper plate that is provided above the acceleration sensor chip. The stopper plate includes: a plurality of fixing portions that are protrudingly provided at positions opposite to the base portion and are fixed to the base portion; first concave portions that are formed around the fixing portions at positions opposite to the weight portion and define the displacement of the weight portion; and a second concave portion that is formed at a position opposite to the beam portions and is deeper than the first concave portion.

6 Claims, 9 Drawing Sheets

SEMICONDUCTOR ACCELERATION SENSOR

CROSS REFERENCE TO RELATED APPLICATION

This application claims the priority of Application No. 2008-086818, filed Mar. 28, 2008 in Japan, the subject matter of which is incorporated herein by reference.

TECHNICAL FIELD OF THE INVENTION

The present invention relates to a semiconductor acceleration sensor that detects acceleration, and more particularly, to a semiconductor acceleration sensor using a MEMS (micro-electromechanical system) technology used for a semiconductor microfabrication process.

BACKGROUND OF THE INVENTION

Conventionally, a variety of types of a semiconductor acceleration sensor using the MEMS technology is disclosed in the following documents.

[Patent Document 1] JP2006-153519A
[Patent Document 2] JP2001-160626A
[Patent Document 3] JP2004-212403A JP2006-153519A discloses a technique for a piezoelectric resistance-type three-axis (three dimensional) semiconductor acceleration sensor of two-point-supported type. The piezoelectric resistance-type three-axis semiconductor acceleration sensor includes a MEMS acceleration sensor chip in which thin silicon beam portions support the weight portion (mass) at both sides, the beam portions are distorted when the weight portion (mass) is moved by acceleration, and the acceleration is detected by a variation in the resistance of a piezoelectric resistor formed in the beam portion due to the distortion. In addition, in order to define the excessive displacement of the weight portion (mass) in the upward direction, a stopper plate is provided above the weight portion (mass) with a predetermined gap therebetween. Then, the acceleration sensor chip and the stopper plate are inserted into a hollow package.

JP2001-160626A discloses a technique for a piezoelectric resistance-type semiconductor acceleration sensor of a one-point-supported type. The piezoelectric resistance-type semiconductor acceleration sensor includes a MEMS acceleration sensor chip in which a silicon beam portion supports a weight portion (mass) at one side, the weight portion (mass) is distorted when the weight portion (mass) is displaced in the vertical direction by acceleration, and the acceleration is detected by a variation in the resistance of a piezoelectric resistor formed on the beam portion due to the distortion. In addition, in order to define the displacement of the weight portion (mass) in the vertical direction, stopper substrates are provided above and below the weight portion (mass) with predetermined gaps therebetween.

JP2004-212403A discloses a technique for a piezoelectric resistance-type semiconductor acceleration sensor of a single-hand type. The piezoelectric resistance-type semiconductor acceleration sensor includes a MEMS acceleration sensor chip in which a silicon beam portion supports a weight portion (mass) at one side, the weight portion (mass) is distorted when the weight portion (mass) is displaced in the vertical direction by acceleration, and the acceleration is detected by a variation in the resistance of a piezoelectric resistor formed on the beam portion due to the distortion. In addition, in order to define the displacement of the weight portion (mass) in the vertical direction, a linear stopper is provided above the weight portion (mass) with a predetermined gap therebetween. Furthermore, a cover having a concave portion is provided below the weight portion (mass) with a predetermined gap therebetween, and a protruding stopper for regulating the displacement of the weight portion (mass) in the downward direction is formed in the concave portion.

However, the semiconductor acceleration sensors according to the related art have the following problems.

The both-hand type semiconductor acceleration sensor disclosed in JP2006-153519A includes a plurality of beam portions. When acceleration is detected, the weight portion (mass) is displaced, and the beam portions are bent upward. At that time, when the stopper plate defines the displacement of the weight portion (mass), the beam portion may collide with the stopper plate by the adjustment of displacement (adjustment of the gap between the MEMS acceleration sensor chip and the stopper plate). In this case, the beam portion may be damaged by the collision.

In addition, in the piezoelectric resistance-type semiconductor acceleration sensor disclosed in JP2006-153519A, a portion of the beam portion in which the piezoelectric resistor is formed is likely to collide with the stopper plate. In this case, the piezoelectric resistor itself and a protective film formed on the surface of the piezoelectric resistor are damaged. When the protective layer formed on the surface of the piezoelectric resistor as well as the piezoelectric resistor itself is damaged, stress applied to the piezoelectric resistor varies, and the characteristics of the piezoelectric resistor are likely to vary.

In the one-point-supported type semiconductor acceleration sensor disclosed in JP2001-160626A and JP2004-212403A, one side of the weight portion (mass) is connected to the beam portion, and the other side of the weight portion (mass) opposite to the one side is opened. Therefore, when the beam portion is bent, the opposite side of the weight portion (mass) is displaced more than the beam portion. As a result, the beam portion is likely to collide with the stopper substrate or the linear stopper.

OBJECTS OF THE INVENTION

Accordingly, an object of the present invention is to provide a semiconductor acceleration sensor capable of preventing the damage of a weight portion (mass), a beam portion, and a piezoelectric resistor and a variation in the characteristics thereof and improving reliability.

SUMMARY OF THE INVENTION

According to a first aspect of the invention, a semiconductor acceleration sensor includes an acceleration sensor chip that includes a weight portion (mass), a base portion provided around the weight portion (mass) with a gap therebetween, and beam portions flexibly connecting the weight portion (mass) and the base portion; and a stopper plate that is provided above the acceleration sensor chip. The stopper plate includes: a plurality of fixing portions that are protrudingly provided at positions opposite to the base portion and are fixed to the base portion; first concave portions that are formed around the fixing portions at positions opposite to the weight portion (mass) and define the displacement of the weight portion (mass); and a second concave portion that is formed at a position opposite to the beam portions and is deeper than the first concave portion.

According to a second aspect of the invention, there is provided a semiconductor acceleration sensor including an acceleration sensor chip and a stopper plate that is provided above the acceleration sensor chip. The acceleration sensor chip includes: a weight portion (mass); a base portion that is provided around the weight portion (mass) with a gap therebetween; and beam portions that flexibly connect the weight portion (mass) and the base portion. The stopper plate includes a concave portion formed at a position that is opposite to the beam portions.

According to a third aspect of the invention, there is provided a semiconductor acceleration sensor including an acceleration sensor chip and a stopper plate that is provided above the acceleration sensor chip. The acceleration sensor chip includes: a weight portion (mass); a base portion that is provided around the weight portion (mass) with a gap therebetween; and beam portions that flexibly connect the weight portion (mass) and the base portion. The stopper plate includes: fixing portions that are fixed to the base portion with a predetermined gap from the weight portion (mass) and define the displacement of the weight portion (mass); and concave portions that are formed in the fixing portions at positions opposite to the beam portions.

In the semiconductor acceleration sensor according to the third aspect of the invention, preferably, a plurality of first slits that extend in the same direction and are filled with an adhesive are formed in the surface of each of the plurality of fixing portions opposite to the base portion.

More preferably, a second slit that prevents the leakage of the adhesive is formed in the surface of each of the plurality of fixing portions opposite to the base portion in a direction that is substantially vertical to the plurality of first slits.

A boundary between the concave portion and the fixing portion may have a curved shape.

The beam portions may swingably support the weight portion (mass) at four points that are substantially orthogonal to the base portion. In this case, the fixing portions are fixed to the base portion at positions opposite to the vicinities of four corners of the base portion, with a predetermined gap from the weight portion (mass).

The concave portion may be formed in a substantially cross shape with a predetermined width in the stopper plate at positions that are opposite to the beam portion. In this case, preferably, a portion of the boundary between the cross shape and the fixing portion passes through a portion of the weight portion (mass), and has a curved shape.

According to a fourth aspect of the invention, there is provided a semiconductor acceleration sensor including an acceleration sensor chip; a stopper portion; and an adhesive layer. The acceleration sensor chip includes: a weight portion (mass) that includes a central mass portion having a square-shaped upper surface and peripheral mass portions that are connected to four corners of the central mass portion and have square-shaped upper surfaces; a base portion that surrounds the weight portion (mass) with a gap therebetween; beam portions that flexibly connect the weight portion (mass) and the base portion. The stopper portion covers the weight portion (mass) and the beam portions of the acceleration sensor chip. The adhesive layer connects the base portion and the stopper portion of the acceleration sensor chip. The distance between the corner of the peripheral mass portion of the weight portion (mass) that is furthest away from the central mass portion and the stopper portion is less than the distance between the beam portion and the stopper portion.

In the semiconductor acceleration sensor according to the fourth aspect of the invention, preferably, the distance between the corner of the peripheral mass portion that is furthest away from the central mass portion and the stopper portion is less than the distance between another corner adjacent to the furthest corner and the stopper portion.

According to the above aspects of the invention, a concave portion is formed in a stopper plate at a position corresponding to a beam portion. Therefore, it is possible to define the displacement of a weight portion (mass) without giving an impact to the beam portion.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1A:
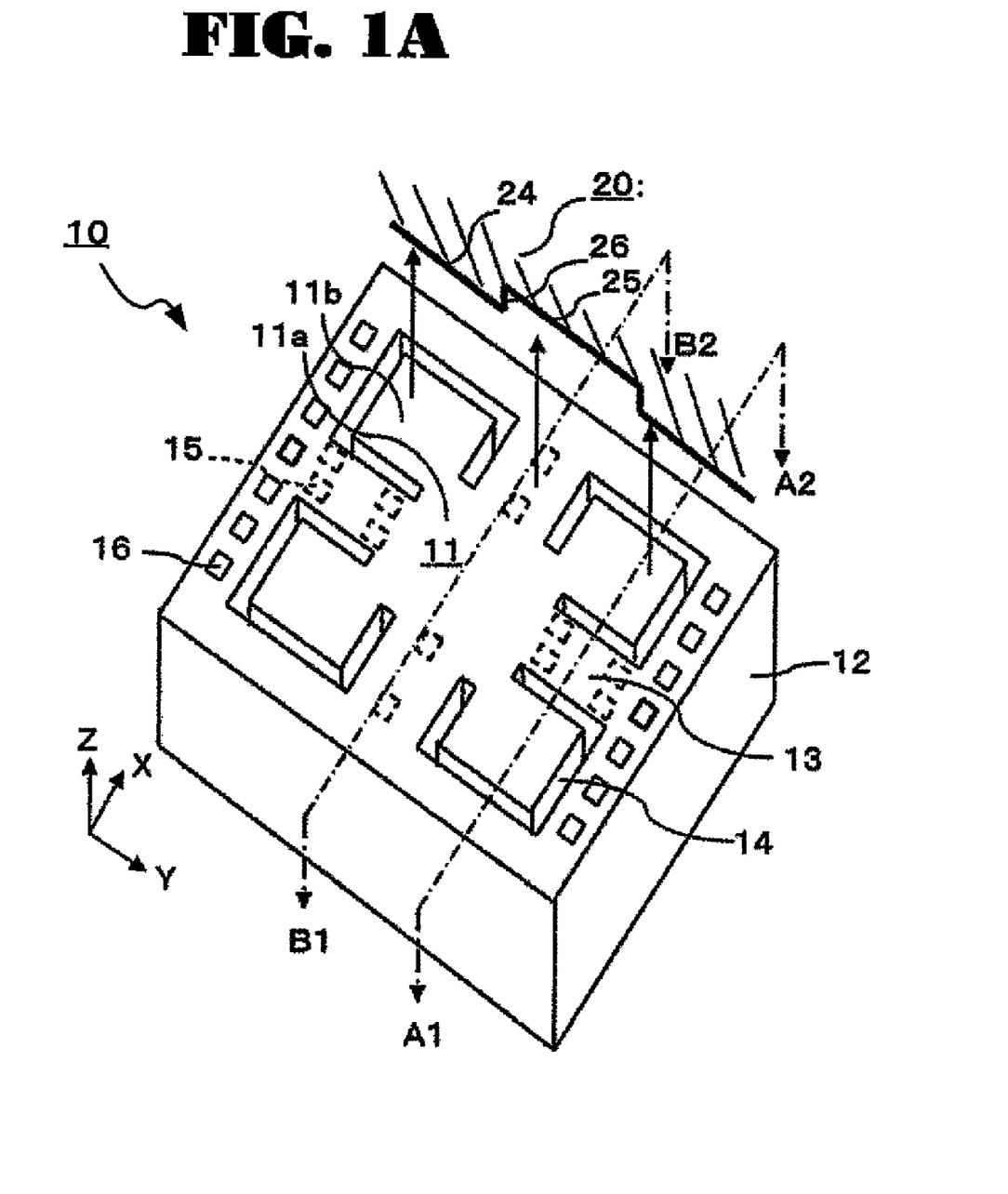
FIGS. 1A and 1B are diagrams schematically illustrating the structure of a piezoelectric resistance-type three-axis semiconductor acceleration sensor according to a first embodiment of the invention.
Figure 1B:
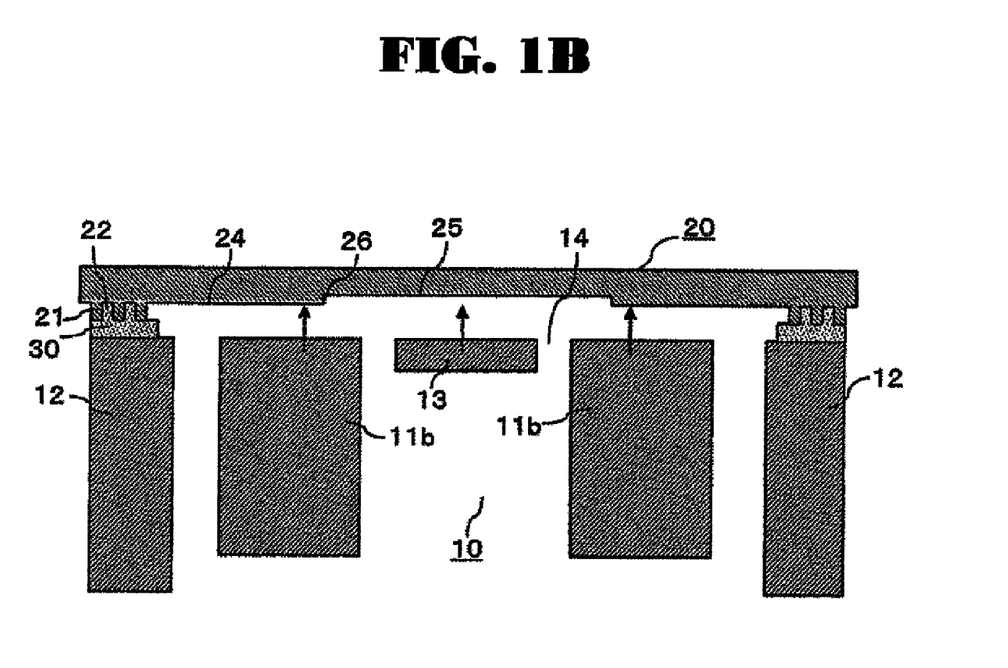
Figure 2:
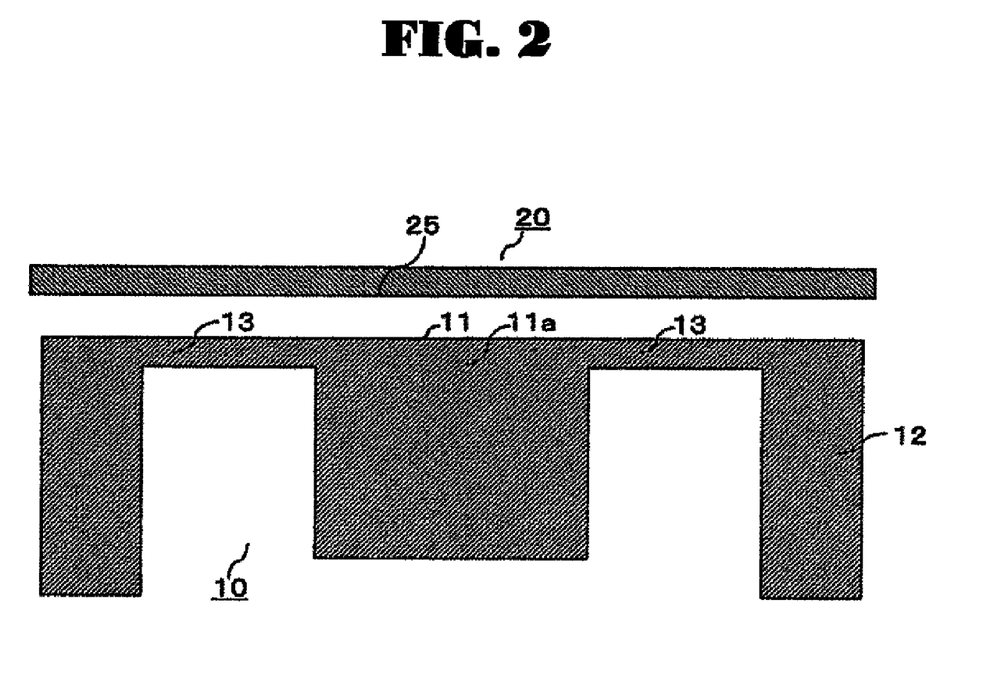
FIG. 2 is an enlarged cross-sectional view taken along the line B1-B2 of FIG. 1A.
Figure 3:
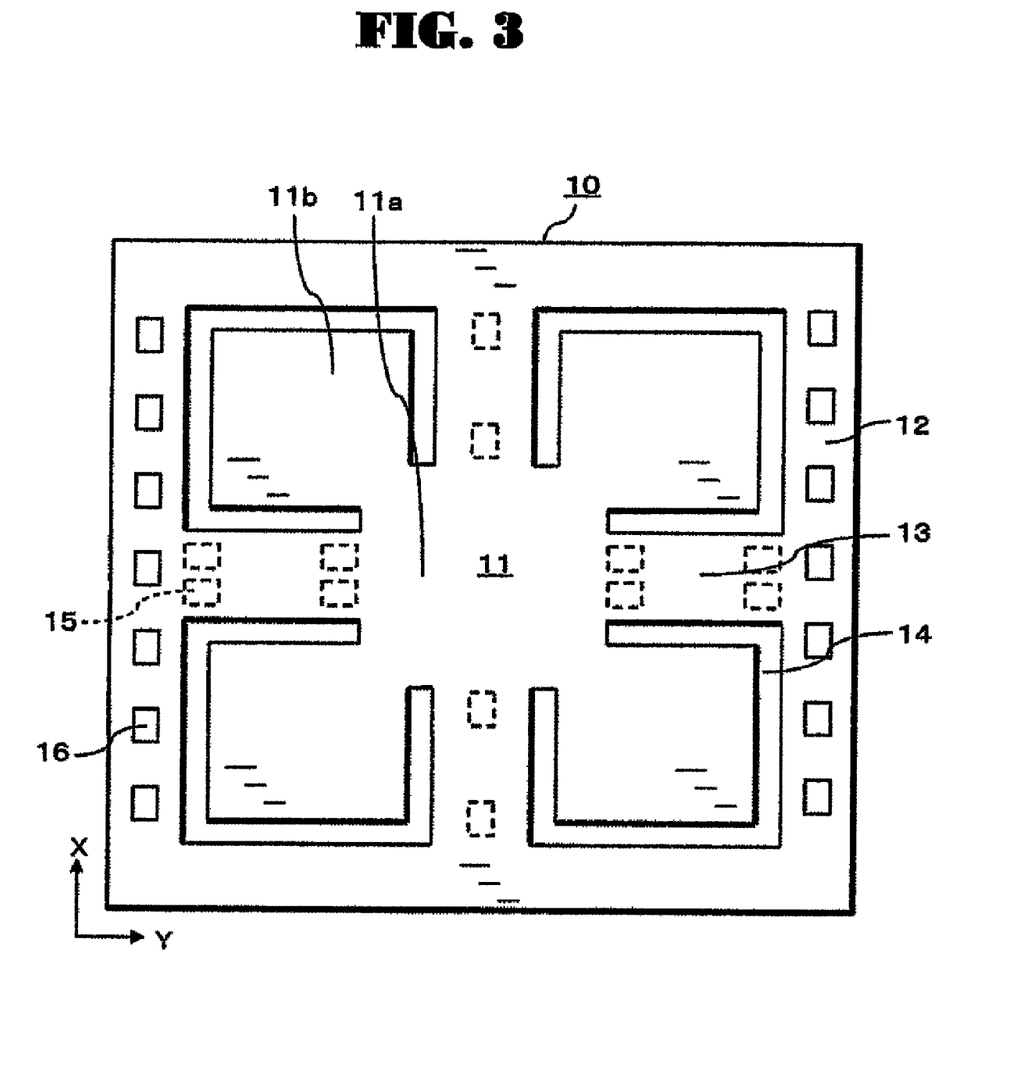
FIG. 3 is a plan view illustrating an acceleration sensor chip shown in FIGS. 1A and 1B.
Figure 4:
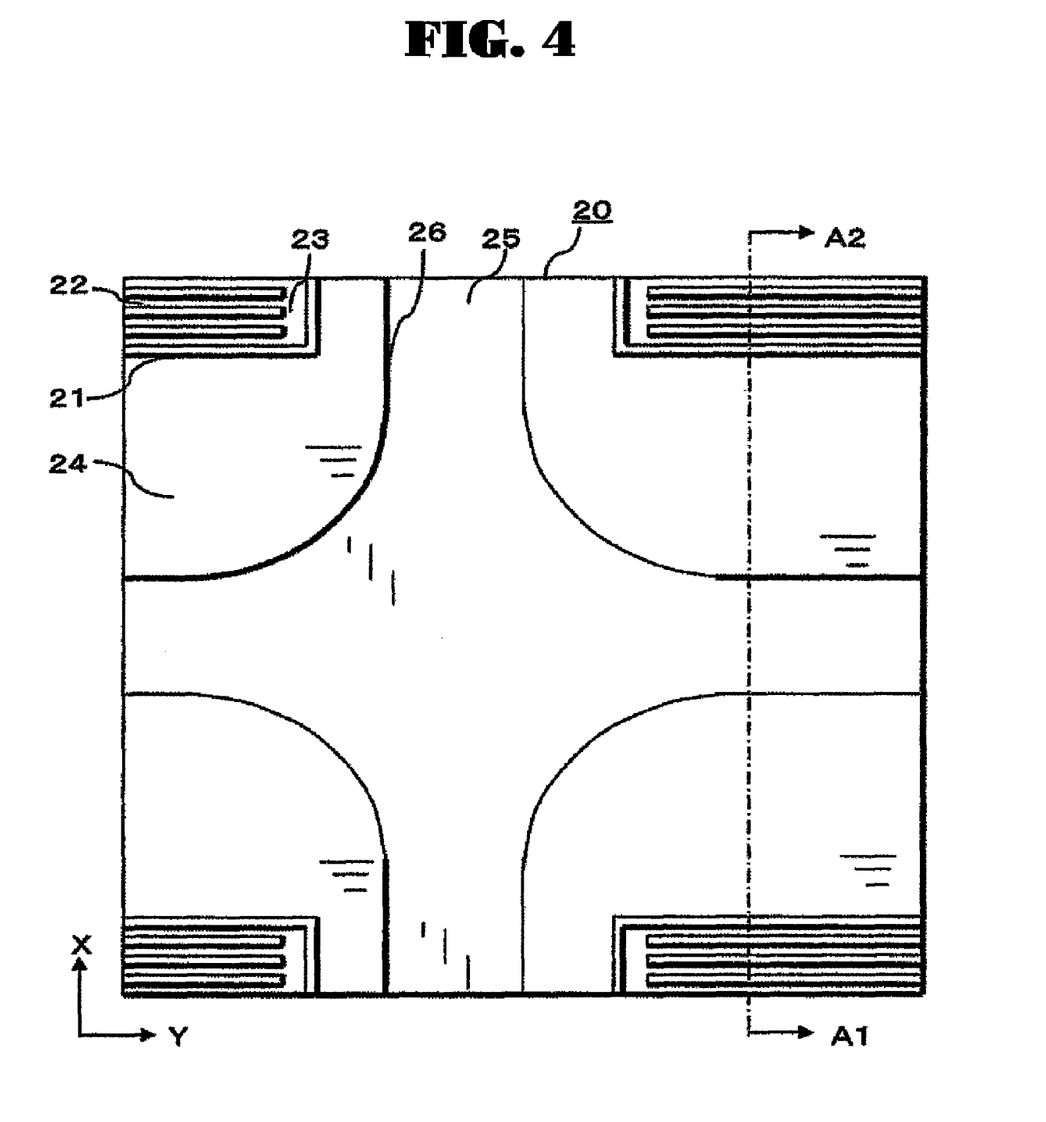
FIG. 4 is a bottom view illustrating a stopper plate shown in FIGS. 1A and 1B.
Figure 5:
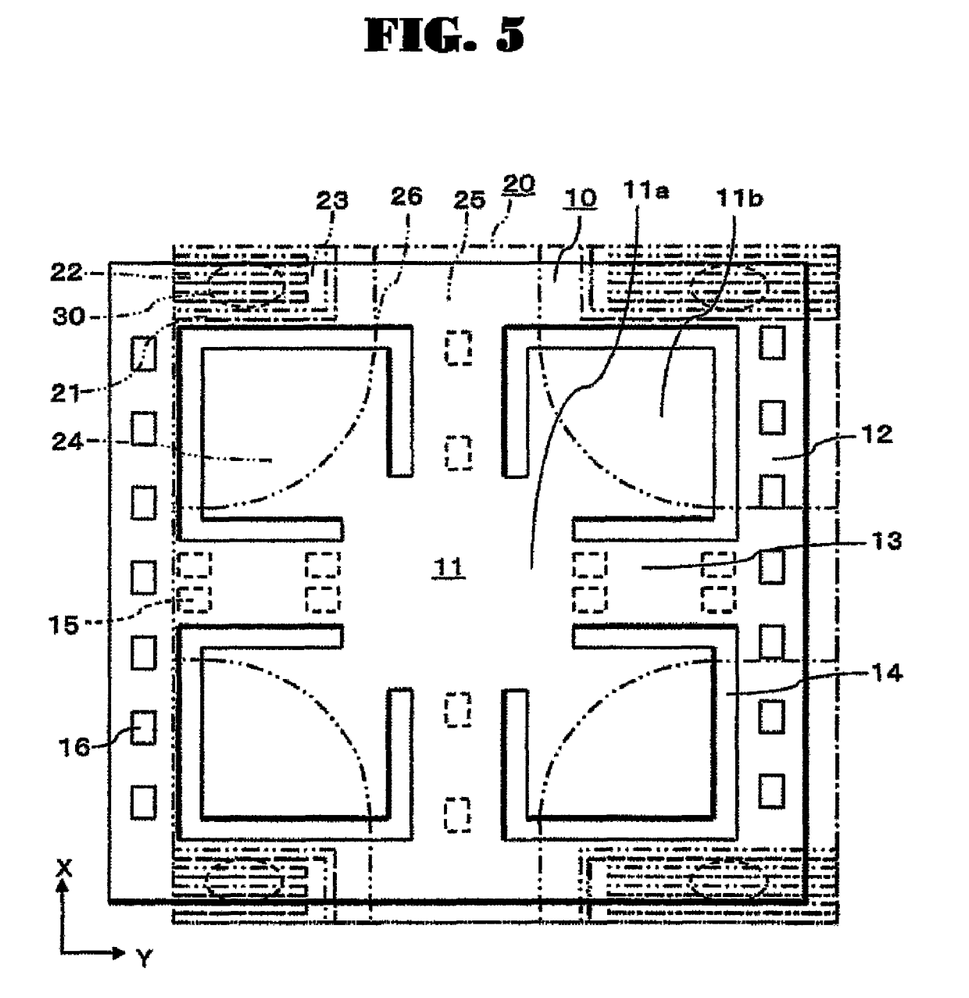
FIG. 5 is a plan view illustrating a state where the stopper plate is mounted on the acceleration sensor chip shown in FIGS. 1A and 1B.

FIGS. 1A and 1B are diagrams schematically illustrating the structure of a piezoelectric resistance-type three-axis semiconductor acceleration sensor of a both-hand type according to a first embodiment of the invention. Specifically, FIG. 1A is a perspective view diagrammatically illustrating the overall structure of the semiconductor acceleration sensor, and FIG. 1B is an enlarged cross-sectional view taken along the line A1-A2 of FIG. 1A. FIG. 2 is an enlarged cross-sectional view taken along the line B1-B2 of FIG. 1A. FIG. 3 is a plan view illustrating an acceleration sensor chip shown in FIGS. 1A and 1B. FIG. 4 is a bottom view illustrating a stopper plate shown in FIGS. 1A and 1B. FIG. 5 is a plan view illustrating a state where the stopper plate is mounted on the acceleration sensor chip shown in FIGS. 1A and 1B. In FIG. 4, the same cut portion as that shown in FIG. 1A is taken along the line A1-A2 of FIG. 1A.

The semiconductor acceleration sensor shown in FIGS. 1A, 1B, and FIG. 2 includes an acceleration sensor chip 10 that is formed by microfabricating an SOI (silicon on insulator) substrate using, for example, a MEMS technology and a lid-shaped stopper plate 20 that is formed by etching a silicon substrate and is fixed to the acceleration sensor chip 10.

As shown in FIGS. 1 to 3, the acceleration sensor chip 10 includes a weight portion (mass) 11 that includes a square upper surface, has a substantially quadratic prism shape (a length in an X-axis direction: about 1.7±(+/−) 0.5 mm, a width in a Y-axis direction: about 1.7±(+/−) 0.5 mm, and a thickness in a Z-axis direction: about 350±(+/−) 50 µm) and is arranged at the center of the chip, a base portion 12 that is arranged around the weight portion (mass) 11 with a gap therebetween, and beam portions 13 that swingably (flexibly) support the weight portion (mass) 11 at four points in the X-axis and Y-axis directions orthogonal to the base portion 12.

The weight portion (mass) 11 includes a central mass portion 11a that is thinner than the base portion 12 so as to be vertically displaced in the Z-axis direction, has a square-shaped upper surface provided at the center of the weight portion (mass), and has a substantially quadratic prism shape, and four peripheral mass portions 11b that are connected to four corners of the central mass portion 11a and each have a square-shaped upper surface and a substantially quadratic prism shape. Slits 14 are formed around each of the peripheral mass portions 11b such that the peripheral mass portion 11b can be displaced in the horizontal direction (that is, a plane direction including the X-axis and the Y-axis). The periphery of the weight portion (mass) 11 is surrounded by the base portion 12 through the slits 14. The base portion 12 and the central mass portion 11a are flexibly connected to each other by strip-shaped four beam portions 13 that are arranged in the X-axis and Y-axis directions orthogonal to each other.

A plurality of piezoelectric resistors 15 are formed in the plane of each of the beam portions 13 (that is, the upper surface). In addition, a plurality of pads 16 for external lead terminals are formed at both ends of the upper surface of the base portion 12 in the X-axis direction. The plurality of piezoelectric resistors 15 are electrically connected to the plurality of pads 16 through a wiring layer (not shown) so as to form a bridge circuit that detects acceleration in the X-axis direction, the Y-axis direction, and the Z-axis direction. A protective film, such as a silicon nitride film, covers the upper surface of the acceleration sensor chip 10 except for the pads 16.

As shown in FIGS. 1A and 1B, FIG. 2, and FIG. 4, the stopper plate 20 is a square-shaped plate (for example, a silicon plate) that is fixed to the acceleration sensor chip 10 by an adhesive (die bond) 30, and the surface (that is, the front surface) of the plate is flat. The surface size of the stopper plate 20 is slightly larger than that of the acceleration sensor chip 10. For example, the surface size of the stopper plate 20 is as follows: a length in the X-axis direction: 1.5±(+/−) 0.5 mm; a width in the Y-axis direction: 2.0±(+/−) 0.5 mm; and a thickness in the Z-axis direction: about 90±(+/−) 20 um, which is slightly larger than that of the acceleration sensor chip 10. As shown in FIG. 5, the stopper plate is mounted on the acceleration sensor chip 10 so as to slightly protrude therefrom to the right side in the Y-axis direction. The size of the surface of the stopper plate 20 may be equal to or smaller than that of the upper surface of the acceleration sensor chip 10.

Four fixing portions 21 are protrudingly provided from the bottom (that is, the rear surface) of the stopper plate 20 at four corners opposite to the four corners of the upper surface of the base portion and are fixed to the base portion 12 by the adhesive 30. The stopper plate 20 serves as a stopper portion that covers the weight portion (mass) 11 and the beam portions 13 of the acceleration sensor chip 10, and the adhesive 30 serves as an adhesive layer that connects the base portion 12 and the stopper portion of the acceleration sensor chip 10. Each of the fixing portions 21 has a square-shaped bottom and the thickness thereof is, for example, about 5±(+/−) 0.5 um. A plurality of first slits 22 that are filled with an adhesive are formed in the bottom of each of the fixing portions 21 so as to extend in the same direction (for example, in the Y-axis direction). Each of the slits 22 has a width of about 40±(+/−) 5 um, and the gap between the slits is, for example, about 40±(+/−) 5 um. The plurality of first slits 22 formed in each of the four fixing portions 21 extend in the same direction, and serve as grooves that receive the applied adhesive 30 and spread the remainder of the adhesive 30 in the same direction. In addition, a second slit 23 that is connected to the ends of the plurality of first slits 22 close to the beam portion 13, extends in a direction that is substantially vertical to the slits 22 (for example, in the X-axis direction), and prevents the leakage of the adhesive is formed in each fixing portion.

A first concave portion 24 that defines the displacement of the peripheral mass portion 11b in the Z-axis direction is formed in the vicinity of each of the four fixing portions 21 at a position that is opposite to the peripheral mass portion 11b of the weight portion (mass) 11. In addition, a second concave portion 25 that is deeper than the first concave portion 24 is formed adjacent to the four first concave portions 24 at a position that is opposite to the four beam portions 13. For example, the depth of the first concave portion 24 from the bottom of the fixing portion is about 5±(+/−) 0.5 um, and the depth of the second concave portion 25 from the bottom of the first concave portion is about 5±(+/−) 0.5 um.

As shown in FIGS. 4 and 5, a portion of the boundary 26 between each of the first concave portions 24 and the second concave portion 25 is curved. That is, the second concave portion 25 is formed in a substantially cross shape having a predetermined width at a position opposite to the beam portions 13 in the rear surface of the stopper plate, and the boundary 26 between the cross-shaped central portion and each of the first concave portions 24 has a curved shape that passes through a portion of the peripheral mass portion 11b of the weight portion (mass) 11. As viewed from the upper surface, the curved line passes through positions corresponding to the peripheries of two corners adjacent to the corner of the peripheral mass portion 11b that is furthest away from the central mass portion 11a, and has an arc shape that protrudes toward the central mass portion 11a. The width of the cross-shaped end is more than the gap between adjacent peripheral mass portions 11b. The boundary 26 is defined by the above-mentioned shape.

Therefore, since the first concave portions 24 and the second concave portion 25 have the above-mentioned shapes, the distance between the stopper plate 20 and the beam portion 13 is greater than the distance between the stopper plate 20 and the weight portion (mass) 11. In the weight portion (mass) 11, the distance between the stopper plate 20 and the corner of the peripheral mass portion 11b that is furthest away from the central mass portion 11a is less than the distance between the stopper plate 20 and the corner that is furthest away from the central mass portion.

As such, the above-mentioned shape of the stopper plate 20 and the positional relationship between the acceleration sensor chip 10 and the stopper plate 20 enable the stopper plate 20 to prevent contact with the beam portions 13. Therefore, it is possible to prevent a variation in the characteristics of the acceleration sensor chip 10. In addition, since the first concave portion 24 covers a portion of the peripheral mass portion 11b, it is possible to prevent the displacement of the weight portion (mass) 11 while preventing the contact area of the peripheral mass portion with the weight portion (mass) 11 from being excessively increased.

A plurality of acceleration sensor chips 10 shown in FIGS. 1A, 1B, and 2 are formed by microfabricating an SOI wafer by photolithography etching using, for example, a MEMS technology, and they are divided into individual acceleration sensor chips.

FIGS. 6A to 6G are views schematically illustrating a method of manufacturing the stopper plate 20 taken along the line A1-A2 of FIG. 4.

Figure 6:
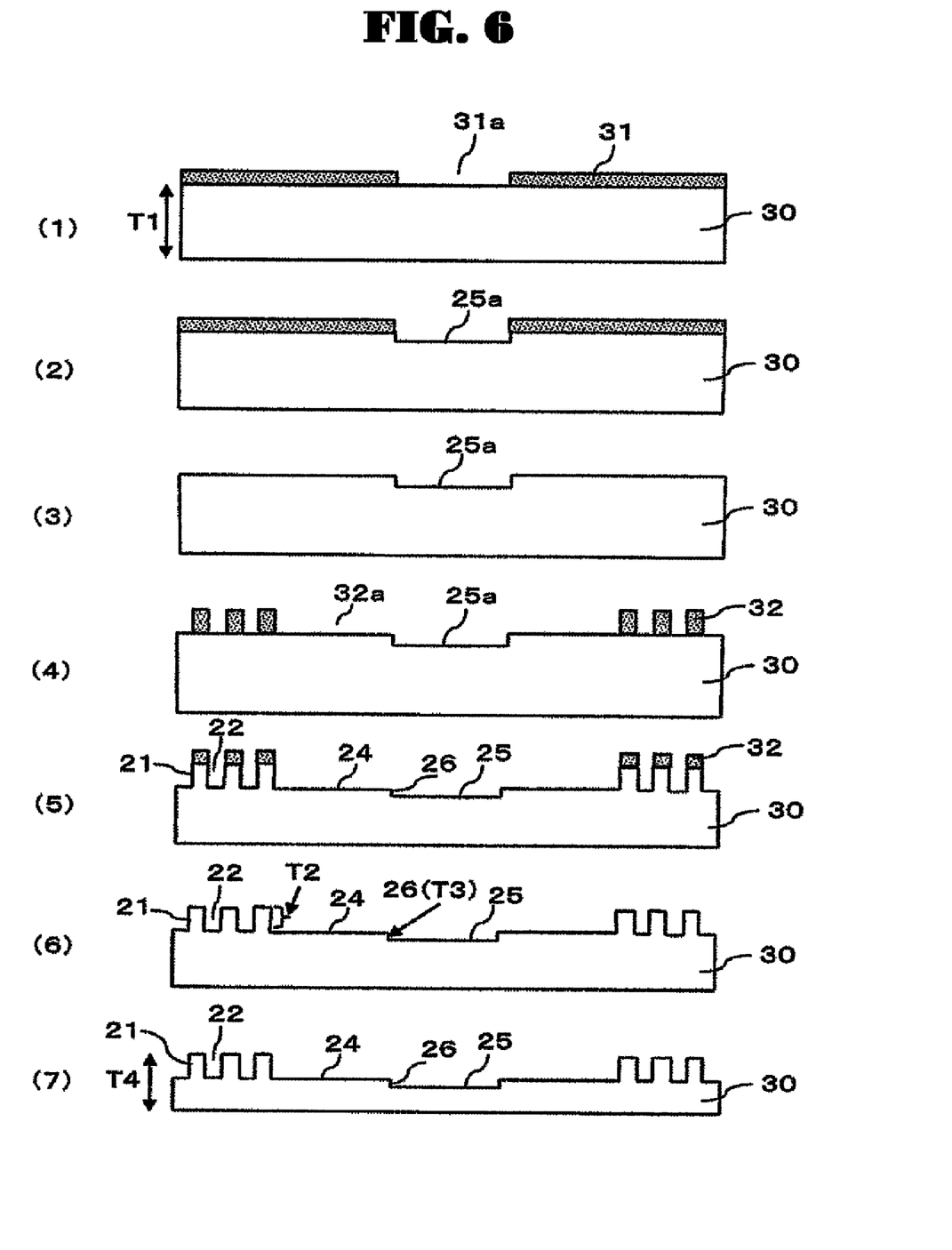
FIGS. 6A to 6G are views schematically illustrating a method of manufacturing the stopper plate 20 taken along the line A1-A2 of FIG. 4.

For example, in a plurality of square-shaped stopper plate forming regions arranged on a silicon wafer (a length in the X-axis direction: about 1.5±(+/−) 0.5 mm, a width in the Y-axis direction: about 2.0±(+/−) 0.5 mm, and a thickness (T1) in the Z-axis direction: about 625 μm±(+/−) 20 um), a resist is formed on a silicon substrate 30 forming the silicon wafer to selectively form a first resist pattern 31 on the silicon substrate except for a region 31a corresponding to the second concave portion 25 shown in FIG. 4 (a process shown in FIG. 6A).

Then, dry etching is performed on the silicon substrate 30 using the first resist pattern 31 as a mask to remove the region 31a of the silicon substrate 30, thereby forming a concave portion 25a in the silicon substrate 30 (a process shown in FIG. 6B). Thereafter, the unnecessary first resist pattern 31 is removed (a process shown in FIG. 6C).

Then, a separate resist is formed, and a second resist pattern 32 from which a region 32a corresponding to the first concave portions 24 and the second concave portion 25 shown in FIG. 4, and the first slits 22 and the second slits 23 of the fixing portions 21 is removed is selectively formed (a process shown in FIG. 6D). For example, as another manufacturing method, polyimide resin (a coating agent used as a protective coating agent of an integrated circuit (IC)) may be used. In general, the coating agent is coated with a thickness of about 10 um, a patterning and developing process is performed using the same mask, and the coating film is cured and contracted to about 5 um. In this way, it is possible to obtain the same effects as described above. As other manufacturing methods, dry etching may not be used.

Dry etching is performed on the silicon substrate 30 using the second resist pattern 32 as a mask to uniformly remove the region 32a and the concave portion 25a, thereby forming the fixing portions 21 each having the first slits 22 and the second slits 23, the first concave portions 24, and the second concave portion 25 (a process shown in FIG. 6E). Thereafter, the unnecessary second resist pattern 32 is removed (a process shown in FIG. 6F). For example, in the fixing portion 21, the width of the first slit 22 and the gap between the first slits are about 40±(+/−) 5 um, the height (T2) of the fixing portion 21 from the first concave portion 24 is in the range of about 1.3 um to about 10 um (preferably, about 5±(+/−) 0.5 um), and the height (T3) of the first concave portion 24 from the second concave portion 25 is about 5±(+/−) 0.5 um.

Finally, polishing is performed from the rear surface of the silicon substrate 30 to reduce the thickness of the silicon wafer to a desired value (for example, a thickness (T4) in the Z-axis direction: about 100 um±(+/−) 20 um) (a process shown in FIG. 6G). Then, a plurality of stopper plates 20 formed on the silicon wafer are divided into individual stopper plates.

The acceleration sensor chip 10 is fixed to a mounting device (die bonder), and as shown in FIG. 5, a predetermined amount of adhesive 30 is applied around four corners of the base portion 12. It is desirable that the adhesive 30 is made of a soft material having a silicone resin as a main component in order to prevent the base portion 12 from being affected by the stopper plate 20. Four positions around the four corners of the base portion 12 to which the adhesive 30 is applied are determined considering the spreading of the applied adhesive 30. For example, it is desirable that the left side of the position where the adhesive is applied is spaced from the end of the beam portion 13 close to the base portion 12 as far as possible and the adhesive is applied at a position that has no effect on the left column of pads 16. The amount of adhesive 30 applied can be set as follows. For example, the volume of the adhesive when a maximum amount of adhesive is applied considering a variation is calculated, and the amount of adhesive applied is set from the volumes of the grooves of the first and second slits 22 and 23 filled with the adhesive.

The stopper plate 20 is held by the die bonder, and the rear surface of the stopper plate 20 is positioned on the acceleration sensor chip 10. The positioning is performed as follows. For example, the fixing portion 21 of the stopper plate 20 is aligned with the left adhesive application position, and the central point of the second concave portion 25 having a substantially cross shape of the stopper plate 20 is aligned with the central point of the central mass portion 11a of the weight portion (mass) 11. In this way, as shown in FIG. 5, the left side of the stopper plate 20 deviates from the left column of the pads 16 of the base portion 12 to the right side, and the right side of the stopper plate 20 protrudes from the right side of the base portion 12. In addition, the upper and lower sides of the stopper plate 20 slightly protrude from the upper and lower sides of the base portion 12.

After the stopper plate 20 is positioned, the stopper plate 20 is mounted on the acceleration sensor chip 10. Then, a predetermined amount of pressure is applied to the stopper plate 20 from the upper side and a heat treatment (baking) is performed thereon for a predetermined time. Then, a plurality of first slits 22 that are formed in each of the fixing portions 21 in order to prevent the flow of the adhesive 30 extend in the same direction, that is, in the Y-axis direction. Therefore, the remainder of the applied adhesive 30 flows in the Y-axis direction. As a result, it is possible to disperse the stress of the adhesive 30 only in the Y-axis direction, and it is easy to keep the balance of force in the X-axis direction and the Y-axis direction. Therefore, it is possible to prevent the distortion of the acceleration sensor chip 10 (that is, a variation in output). In addition, since the second slit 23 is formed in each of the fixing portions 21 in the X-axis direction, it is possible to prevent the applied adhesive 30 from leaking to the beam portion 13.

When a pressing process and a heating process are performed for a predetermined time, the fixing portions 21 formed on the rear surface of the stopper plate 20 are fixed to the base portion 12 of the acceleration sensor chip 10 by the adhesive 30 having a predetermined thickness, and the manufacturing process of the acceleration sensor chip 10 is completed.

Figure 7:
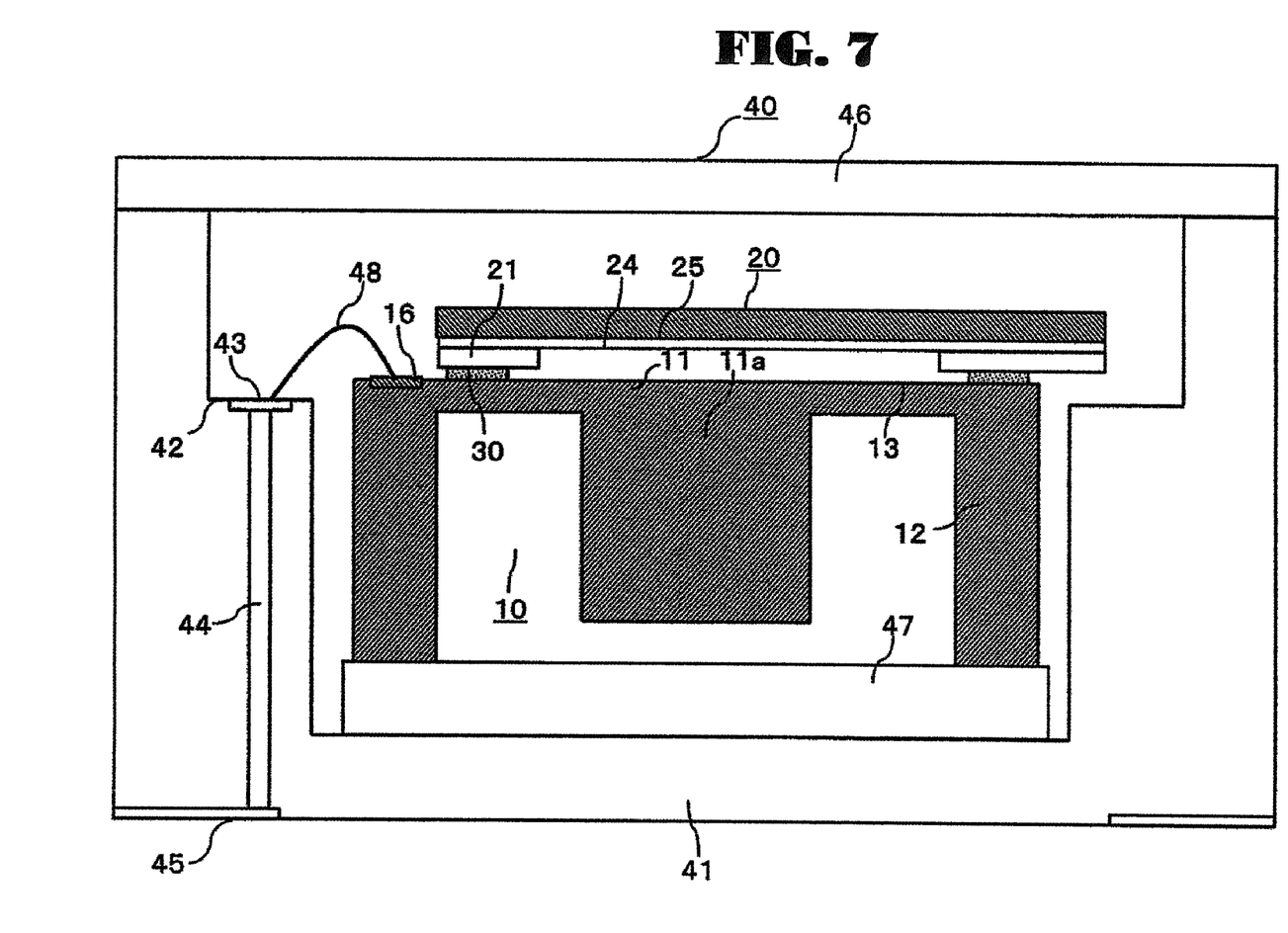
FIG. 7 is a cross-sectional view schematically illustrating an example of the insertion of the semiconductor acceleration sensor shown in FIG. 1 into a package.

FIG. 7 is a cross-sectional view schematically illustrating an example of the insertion of the semiconductor acceleration sensor shown in FIG. 1 into a package.

A package 40 for accommodating the semiconductor acceleration sensor includes, for example, a hollow package body 41 with an opened upper surface, and a plurality of pads 43 are formed on a step portion 42 of the package body 41. The plurality of pads 43 are electrically connected to external terminals 45 that are provided on the bottom of the package body 41 through conductive via holes 44 that pass through the package body 41 in the vertical direction. The upper opening portion of the package body 41 is sealed by a cover 46.

When the semiconductor acceleration sensor shown in FIG. 1 is inserted into the package 40, the bottom of the base portion 12 to which the stopper plate 20 is fixed is fixed to the bottom of the package body 40 by, for example, an adhesive, with a fixing table 47 interposed therebetween. In this case, since the thickness of the weight portion (mass) 11 is smaller than that of the base portion 12, a predetermined gap is formed between the bottom of the weight portion (mass) 11 and the fixing table 47, which makes it possible for the weight portion (mass) 11 to be displaced downward. The pads 16 formed on the upper surface of the base portion 12 are connected to the pads 43 of the package body 41 by wires 47. Then, the upper opening portion of the package body 41 is sealed by the cover 46. In this way, the assembly process is completed.

In FIG. 7, when acceleration acts on the acceleration sensor chip 10, the weight portion (mass) 11 is displaced relative to the base portion 12 according to the direction and the magnitude of acceleration, and the beam portions 13 are curved. Then, the resistance value of the piezoelectric resistor 15 is changed. The change in the resistance value is detected from the external terminal 45. In this way, it is possible to detect acceleration acting on the acceleration sensor chip 10 in the X-axis direction, the Y-axis direction, and the Z-axis direction.

When high acceleration acts on and the weight portion (mass) 11 is excessively displaced in the upward direction of the Z-axis, a portion of the upper surface of the peripheral mass portion 11b of the weight portion (mass) 11 collides with the bottom of the first concave portion 24 formed on the rear surface of the stopper plate 20 to define the displacement of the weight portion (mass) 11 in the upward direction.

According to the first embodiment, the following effects (i) and (ii) are obtained.

(i) When the weight portion (mass) 11 is excessively displaced in the upward direction of the Z-axis, a portion of the upper surface of the peripheral mass portion lib collides with the bottom of the first concave portion 24 to define the displacement of the weight portion (mass) 11 in the upward direction, and the beam portion 13 does not collide with the bottom of the second concave portion 25 that is deeper than the first concave portion 24. Therefore, it is possible to prevent the damage of the beam portions 13. In addition, the piezoelectric resistor 15 provided in the beam portion 13 does not also collide with the bottom of the second concave portion 25, thereby preventing a variation in the characteristics of the piezoelectric resistor 15.

That is, the second concave portion 25 having a substantially cross shape is formed in a wide range above the upper surface of the weight portion (mass) 11 so as to include the entire central mass portion 11a and a portion of the peripheral mass portion 11b. Therefore, collision hardly occurs in a connection portion between the central mass portion 11a of the weight portion (mass) 11 and the beam portion 13 that is most greatly displaced, and the vicinity of the central mass portion 11a. As a result, it is possible to prevent the damage of the weight portion (mass) 11, the beam portions 13, and the piezoelectric resistor 15, and a variation in the characteristics thereof and thus improve the reliability of a semiconductor acceleration sensor.

(ii) As shown in FIGS. 4 and 5, on the rear surface of the stopper plate 20, the boundary 26 between the first concave portion 24 and the second concave portion 25 has a curved shape. Therefore, when the peripheral mass portion 11b of the weight portion (mass) 11 collides with the first concave portion 24, impact is not concentrate on one point, and it is possible to prevent the damage of the portions. In addition, when the bottom of the first concave portion 24 comes into contact with the peripheral mass portion 11b of the weight portion (mass) 11, charge is stored in the rear surface of the stopper plate 20, and the weight portion (mass) 11 is pulled up by electrostatic attraction of the stopper plate 20. In this case, the output of the acceleration sensor chip 10 is likely to vary. However, since the boundary 26 has a curved shape, a contact area between the bottom of the first concave portion 24 and the peripheral mass portion 11b of the weight portion (mass) 11 is reduced, and the amount of charge generated due to the contact is reduced, thereby preventing a variation in output.

Figure 8:
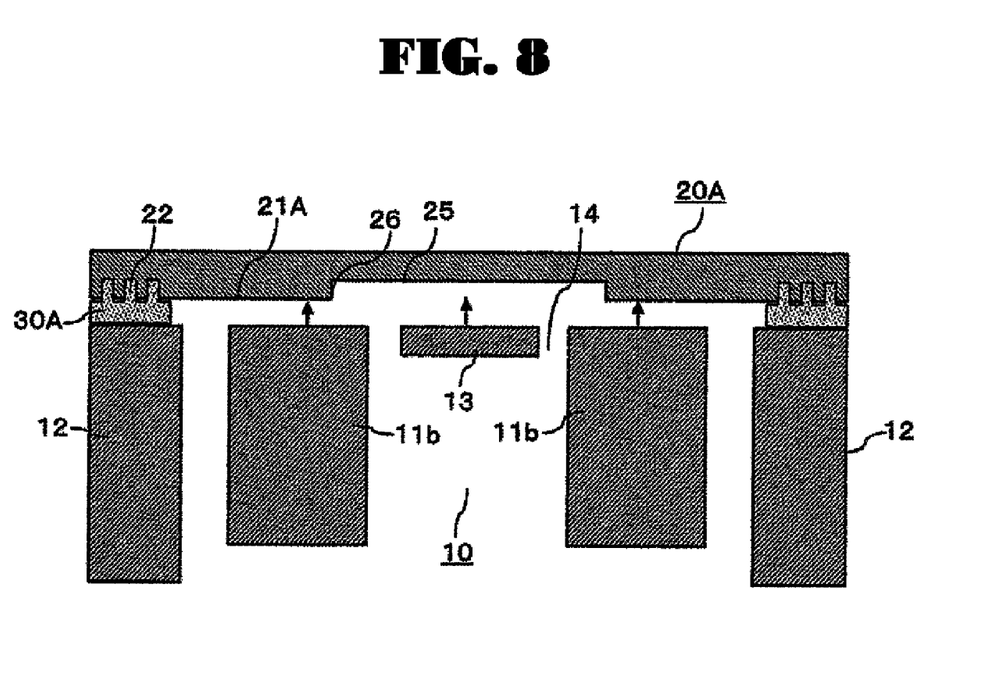
FIG. 8 is an enlarged cross-sectional view schematically illustrating a piezoelectric resistance-type three-axis semiconductor acceleration sensor according to a second embodiment of the invention.

FIG. 8 is an enlarged cross-sectional view schematically illustrating a piezoelectric resistance-type three-axis semiconductor acceleration sensor of a both-hand type according to a second embodiment of the invention. In FIG. 8, the same components as those in the first embodiment shown in FIG. 1B are denoted by the same reference numerals.

In the semiconductor acceleration sensor according to the second embodiment, instead of the stopper plate 20 according to the first embodiment, a stopper plate 20A having a structure that is different from that of the stopper plate 20 is fixed to the same acceleration sensor chip 10 as that in the first embodiment by an adhesive 30A having a predetermined thickness. The adhesive 30A has a thickness that is larger than that of the adhesive 30 according to the first embodiment, and the gap between the rear surface of the fixing portion 21A and the upper surface of the acceleration sensor chip 10 is substantially equal to the gap between the bottom of the first concave portion 24 and the upper surface of the acceleration sensor chip 10 according to the first embodiment.

The stopper plate 20A according to the second embodiment has a flat front surface on the plane side. Fixing portions 21A that are fixed to the base portion 12 by an adhesive 30A with a predetermined gap from the weight portion (mass) 11 of the acceleration sensor chip 10 and define the displacement of the weight portion (mass), and a concave portion 25 (which is the same as the second concave portion 25 according to the first embodiment) that is formed at a position of the fixing portion 21A opposite to the beam portion 13 are provided on the rear surface, which is the bottom, of the stopper plate 20A. Similar to the first embodiment, a plurality of first slits 22 that are filled with an adhesive are formed at four positions of the fixing portion 21A that are opposite to the vicinities of four corners of the base portion 12 so as to extend in the same direction, that is, the Y-axis direction. In addition, second slits 23 that prevent the leakage of the adhesive are formed in a direction that is substantially vertical to the plurality of first slits 22.

Similar to the first embodiment, the boundary between the fixing portion 21A and the concave portion 25 has a curved shape. That is, similar to the first embodiment, the concave portion 25 is formed in a substantially cross shape having a predetermined width in the stopper plate 20A at a position that is opposite to the beam portion 13, and the boundary between the cross-shaped portion and the fixing portions 21A has a curved shape that passes through the peripheral mass portion 11b of the weight portion (mass) 11. The other structures are the same as those in the first embodiment.

The semiconductor acceleration sensor having the above-mentioned structure has substantially the same effects as those in the first embodiment. In particular, the fixing portion 21A according to the second embodiment is formed so as to extend up to the first concave portion 24 according to the first embodiment. Therefore, it is possible to omit a process of forming the first concave portion 24 according to the first embodiment in the method of manufacturing the stopper plate 20A, thereby simplifying a manufacturing process.

The present invention is not limited to the above-described first and second embodiments, but the structures, the shapes, the sizes, or the manufacturing methods of the acceleration sensor chip 10, the stopper plates 20 and 20A, and the package 40 can be changed. For example, the arrangement direction of the four fixing portions 21 shown in FIG. 4 may be changed such that the four fixing portions extend in the X-axis direction. In this case, substantially the same effects as those in the first and second embodiments are obtained. Alternatively, in the first and second embodiments, the semiconductor acceleration sensor may be changed to a one-axis or two-axis semiconductor acceleration sensor or a single-hand type.

What is claimed is:

1. A semiconductor acceleration sensor comprising:
    an acceleration sensor chip that includes a weight portion, a base portion provided around the weight portion with a gap therebetween, and beam portions flexibly connecting the weight portion and the base portion; and
    a stopper plate that is provided above the acceleration sensor chip,
    wherein the stopper plate comprises:
        a plurality of fixing portions that are protrudingly provided at positions opposite to the base portion and are fixed to the base portion;
        first concave portions that are formed around the fixing portions at positions opposite to the weight portion and define the displacement of the weight portion; and
        a second concave portion that is formed at a position opposite to the beam portions and is deeper than the first concave portion.

2. The semiconductor acceleration sensor according to claim 1, wherein
    at least one of the plurality of fixing portions comprises a first surface opposing to the base portion; and a plurality of first slits formed on the surface, the first slits extending in the same direction as each other and being filled with an adhesive.

3. The semiconductor acceleration sensor according to claim 2, wherein
    at least one of the plurality of fixing portions comprises a second slit, which prevents the leakage of the adhesive, on the first surface, the second slit extending in a direction which is substantially vertical to the plurality of first slits.

4. The semiconductor acceleration sensor according to claim 1, wherein
    the first concave portion and the second concave portion are shaped to have a boundary therebetween, which is curved around the center of the stopper plate.

5. The semiconductor acceleration sensor according to claim 1, wherein
    the beam portions is formed to support the weight portion swingably at four points, which are substantially orthogonal to the base portion, and
    the plurality of fixing portions are protrudingly provided from the stopper plate at positions that are opposite to the vicinities of four corners of the base portion.

6. The semiconductor acceleration sensor according to claim 5, wherein
    the second concave portion is formed in a substantially cross shape with a predetermined width in the stopper plate at a position that is opposite to the beam portions, and
    a portion of the boundary between the second concave portion and the first concave portion passes through a part of the weight portion, the portion of the boundary is shaped to be a circular arc with the fixing portion as a center.

* * * * *